UNITED STATES PATENT OFFICE.

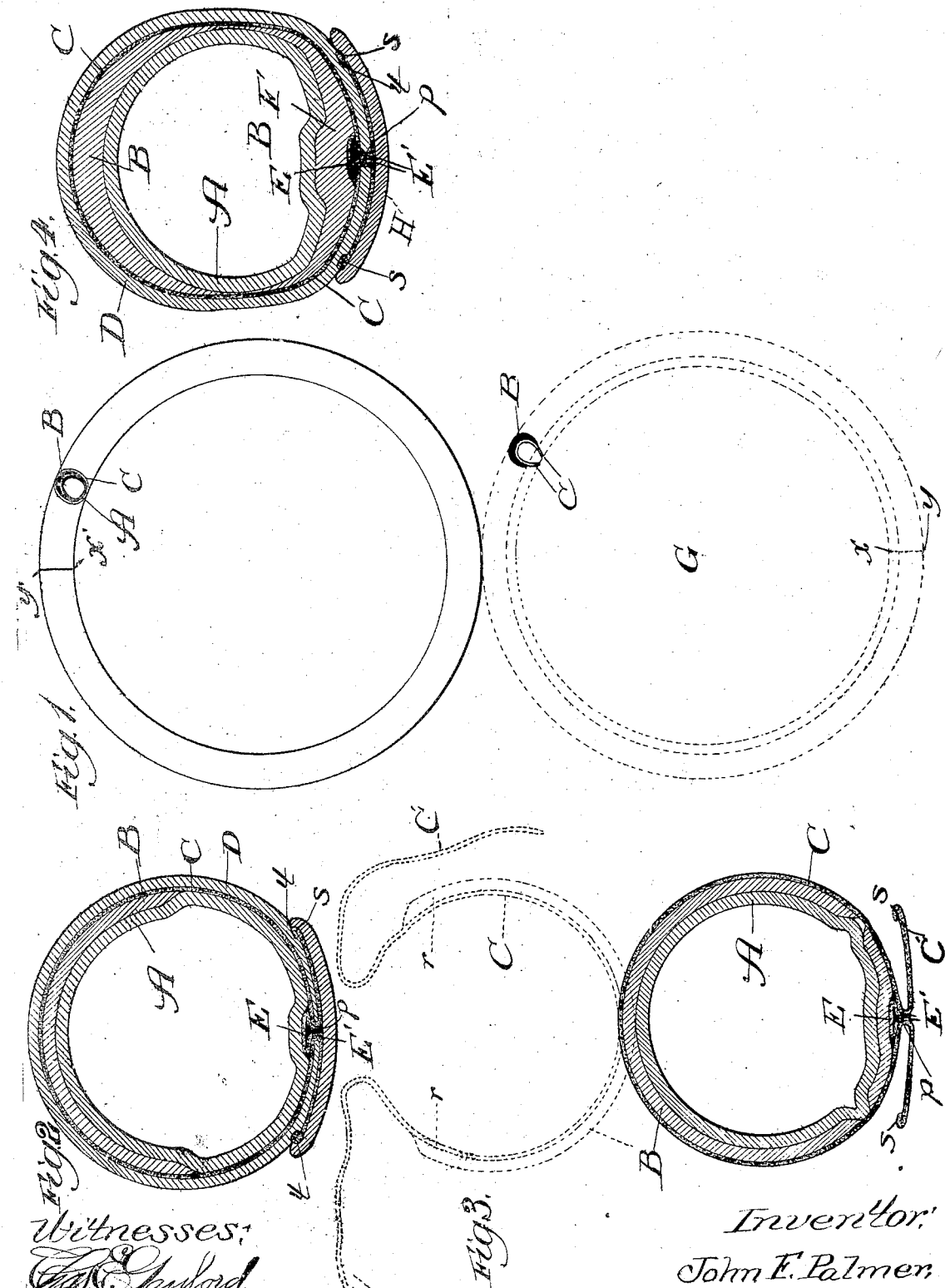

JOHN F. PALMER, OF CHICAGO, ILLINOIS.

PNEUMATIC TIRE.

SPECIFICATION forming part of Letters Patent No. 467,642, dated January 26, 1892.

Application filed December 1, 1891. Serial No. 413,681. (No model.)

*To all whom it may concern:*

Be it known that I, JOHN F. PALMER, a citizen of the United States, residing at Chicago, in the county of Cook and State of Illinois, have invented a new and useful Improvement in Pneumatic Tires and the Method of Producing the Same, of which the following is a specification.

My invention relates to an improvement in pneumatic tires for bicycles, &c., and relates more particularly to a method of providing the air-tube of the pneumatic tire with a protective covering for the purpose of closing any holes that may occur in the tube and to strengthen the tube when in use. Heretofore the usual practice has been to provide on the pneumatic tube a case or covering of canvas and sometimes of layers of canvas and vulcanized rubber. It has been the practice, so far as I am aware, first to form the rubber tube ready for application as a tire and for filling with air, and then when thus produced to apply directly to the same the casing or covering deemed desirable for its protection against expansion and for strengthening it.

The object of my invention is to improve the present structure of tires and the method of producing the same in the particulars hereinafter explained.

My invention relates, also, to an improved construction of the tire under which the material involved in the casing, which is immediately in contact with the pneumatic tube, shall be made of raw rubber or of vulcanized rubber having a facing of raw rubber or otherwise provided with a suitable cement, whereby any apertures in the tire which would permit the escape of air shall be closed by the pressure of the resilient soft rubber.

My invention consists, further, in a method of applying to a pneumatic tire a rubber or similar protective covering extending entirely or part way around the same in cross-section, which consists in molding the covering material upon fabric, such as canvas, in such a manner as to extend in an opposite direction both in cross-section and longitudinally to the intended direction of the covering when applied to the tubing, and thereupon and after thus producing the covering to turn the same longitudinally and transversely to present as the inner face what in the course of production had been the outer face, thereby causing a compression of the resilient material, increasing its effectiveness, all in the manner hereinafter more fully explained.

My invention consists, further, in an improved method of securing the canvas covering upon a pneumatic tube, particularly if the same shall be provided with the intermediate soft-rubber covering above described.

My invention consists, further, in an improved method of securing the outer covering upon the tire having an intermediate canvas covering and of securing the tire so produced to the wheel.

My invention consists, further, in certain details of improvements and combinations of parts, all as hereinafter more fully pointed out.

In the drawings, Figure 1 represents a rubber tire and illustrates the method of its production. Fig. 2 represents a transverse section of a pneumatic-tube tire constructed in accordance with my invention. Fig. 3 represents the method which I prefer to employ for constructing the tire and applying a protective coating; and Fig. 4 is a view in cross-section of a rubber tire provided with my improvement and involving some additional features not shown in Fig. 2.

A represents the pneumatic tube formed in the usual way, so as to present an annular tire to be filled with air.

B represents a coating or covering of soft or raw rubber extending part way around the tire or tube A and inclosing the tread portion of the tube.

C is a covering of canvas or similar fabric inclosing the soft-rubber covering B and tube A, the lateral ends of which canvas covering are brought together and so sewed as to leave the flaps C'.

D represents the outer, preferably vulcanized rubber, covering to inclose the tube, constructed as described, said outer covering D being provided with longitudinal grooves *t* near the converging edges to receive the longitudinal beads s, formed on the outer edges of the flaps C' of the canvas covering C.

E represents a protective loop or doubled strip of canvas introduced under the meeting parts of the canvas covering C, said loop or strip having the longitudinal projecting flaps E', intended to extend between the adjacent parts of the canvas C, so that when the latter are sewed together the stitches will also pass through said flaps, leaving the loop portion E under the stitching to serve as a guard to protect the inner air-tube from the chafing action of the stitched edges.

In practice I prefer to employ in connection with the foregoing construction a soft-rubber protective covering F on the inner side of the tube, which may be applied in any convenient manner before applying and securing the canvas C and outer tube D.

My improved method of applying the covering of soft rubber is illustrated in Figs. 1 and 3, and is as follows: A former or mandrel G is employed, upon which the canvas C is stretched, so as to present substantially the configuration of the finished rubber tire. Upon the canvas thus secured the covering of soft rubber is applied, being caused to adhere to the same in any substantial manner. If, instead of raw rubber, vulcanized rubber be used, I prefer to apply thereto, after it has been secured to the canvas, a facing of raw rubber or other suitable material. When thus formed, the canvas is removed from the former G and turned inside out, so that whereas the covering B when applied on the mandrel was on the outside of the canvas it is now upon the inside, and the meeting ends of the canvas tubing are turned backward and caused to meet in an opposite circle, so that the inner edges $x$ will become the inner edges $x'$, and the outer edges $y$ will become the outer edges $y'$ on the opposite end of a common diametrical line. By thus turning the canvas tubing to the opposite curvature longitudinally and transversely, it is quite apparent that the rubber which is changed from the external to the internal part of the tubing is compressed because the canvas or other fabric or backing is incapable of being stretched.

In practice I usually prefer to apply the rubber to the canvas in a transverse measurement, so as to extend only to the points $r$, thus covering what will constitute the tread portion when the covering is applied to the tire. The canvas is made much wider than the circumferential measurement of the tube A, viewed in cross-section, and thus presents the flaps C', before referred to, when the meeting parts of the canvas are stitched together, as indicated at $p$. Between the meeting parts of the canvas and the interior rubber tube A the loop or protector E is introduced and the stitching passes through the flaps E' thereof. After the external rubber coating has been applied the tube thus constructed may at once be introduced upon the felly H of the wheel, the pressure serving to hold the flaps C' against the tubing, the beads $s$ entering the recess $t$ serving firmly to hold the parts together. When, as in accordance with my preferred construction, a soft-rubber protective coating is introduced upon the inner or hub side of the tube, it may be done as clearly illustrated in Fig. 4, in which case the canvas C incloses the covering F and holds it in position.

What I claim as new, and desire to secure by Letters Patent, is—

1. A pneumatic tire for bicycles, comprising an air-tube having applied to its outer surface a partial tube of soft rubber with an inelastic backing, whereby any apertures occurring in the inner tube may be sealed, substantially as described.

2. The method of applying a protective coating of rubber or like material to the air-tube of a pneumatic tire, which consists in applying the rubber or similar material to a backing having a curvature opposite to that of the tube and thereupon reversing the curvature of the backing and applying it to the pneumatic tube to cause the rubber or similar material to lie between the tube and backing, substantially as described.

3. The method of applying rubber or like material to the air-tube of a pneumatic tire, which consists in applying the rubber or similar material to a flexible backing and thereupon applying the backing to the tube and curving the backing with the rubber or similar material on the interior, so as to present the curvature of the pneumatic tube, whereby the rubber or similar material shall be compressed by reason of its mode of application to the air-tube, substantially as described.

4. The method of applying a protective coating of rubber or similar material to the air-tube of a pneumatic tire, which consists in curving a flexible backing, such as canvas, so as to present in transverse section a curvature opposite to that of the air-tube, then applying to the outer face of the backing in part of its width the layer or coating of rubber or similar material, and then reversing the curvature of the backing and the protective material carried thereby and applying the same to the rubber tube in such manner that the protective material shall be between the backing and tube, substantially as described.

5. In a pneumatic tire for bicycles, the combination, with the air-tube, of a protective layer B of soft rubber or the like, an inclosing casing of canvas or the like, having, when secured, the flaps C' beaded at the lateral extremities, as shown, and the outer covering D, having the longitudinal grooves s to receive the beaded edges of the flaps, substantially as described.

6. A pneumatic tire comprising, in combination, air-tube A, protective layer B on the tread portion, protective layer F on the inner side of the tube-inclosing casing C, and felly H, substantially as described.

7. In a pneumatic tube for bicycles, the combination, with the air-tube A, of an inclosing casing of flexible material C and a loop or strip E between the stitched edges of the casing and the tube, substantially as and for the purpose set forth.

JOHN F. PALMER.

In presence of—
J. N. HANSON,
M. J. FROST.